(12) United States Patent
Hano (10) Patent No.: US 9,912,835 B2
(45) Date of Patent: Mar. 6, 2018

(54) IMAGE FORMING APPARATUS

(71) Applicant: CANON KABUSHIKI KAISHA, Tokyo (JP)

(72) Inventor: Masami Hano, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/370,605

(22) Filed: Dec. 6, 2016

(65) Prior Publication Data

US 2017/0171429 A1   Jun. 15, 2017

(30) Foreign Application Priority Data

Dec. 15, 2015 (JP) .................................. 2015-244463

(51) Int. Cl.
*H04N 1/407* (2006.01)
*G06F 15/00* (2006.01)
*G06K 1/00* (2006.01)
*H04N 1/60* (2006.01)
*G03G 15/00* (2006.01)
*H04N 1/00* (2006.01)
*H04N 1/113* (2006.01)
*H04N 1/29* (2006.01)

(52) U.S. Cl.
CPC ........... *H04N 1/4078* (2013.01); *G03G 15/50* (2013.01); *G03G 15/5062* (2013.01); *G03G 15/55* (2013.01); *H04N 1/00015* (2013.01); *H04N 1/00034* (2013.01); *H04N 1/113* (2013.01); *H04N 1/29* (2013.01); *G03G 15/60* (2013.01); *H04N 2201/0091* (2013.01)

(58) Field of Classification Search
CPC ............ H04N 1/4078; H04N 1/00015; H04N 1/00034; H04N 1/113; H04N 1/29; H04N 2201/0091; G03G 15/50; G03G 15/5062; G03G 15/55; G03G 15/60
See application file for complete search history.

(56) References Cited

U.S. PATENT DOCUMENTS

| 8,422,073 B2 | 4/2013 | Murakami | |
|---|---|---|---|
| 2013/0016179 A1* | 1/2013 | Birkbeck | H04N 1/0408 348/36 |
| 2015/0093138 A1* | 4/2015 | Tashiro | G03G 15/0863 399/90 |

* cited by examiner

*Primary Examiner* — Quang N Vo
(74) *Attorney, Agent, or Firm* — Fitzpatrick, Cella, Harper & Scinto (57) ABSTRACT

Provided is an image forming apparatus including a receiver, the image forming apparatus being controlled based on a copy mode for copying an original read by a reading device that is connectable to the image forming apparatus and a print mode for printing image data received by the receiver. The image forming apparatus further includes an image forming unit configured to form an image, a measurement unit configured to measure a measurement image formed by the image forming unit, a controller configured to control the image forming unit to form the measurement image, and to control the measurement unit to measure the measurement image, and a detector configured to detect a connection state of the reading device. The measurement image includes a first measurement image for the copy mode and a second measurement image for the print mode.

9 Claims, 10 Drawing Sheets

| NAME | Pattern 1 | Pattern 2 |
|---|---|---|
| X | SELECTABLE | SELECTABLE |
| Y | SELECTABLE | SELECTABLE |
| Z | SELECTABLE | SELECTABLE |
| COPY |  | SELECTABLE |

| NAME | READER IS CONNECTED | READER IS NOT CONNECTED |
|---|---|---|
| PDL | 1 | 1 |
| COPY (PHOTOGRAPH/IMAGE) | 2 | - |
| RESOLUTION (HIGH LINE NUMBER) | 3 | 2 |
| COPY CHARACTER PORTION | 4 | - |

FIG. 12

| NAME | Pattern 1 | Pattern 2 |
|---|---|---|
| W | SELECTABLE | SELECTABLE |
| X | SELECTABLE | SELECTABLE |
| Y | SELECTABLE | SELECTABLE |
| X | SELECTABLE | SELECTABLE |
| COPY | | SELECTABLE |

FIG. 13

READER IS NOT CONNECTED

IMAGE FORMING APPARATUS

BACKGROUND OF THE INVENTION

Field of the Invention

The present invention relates to a technology for performing image processing by selectively using a plurality of image processing patterns.

Description of the Related Art

In recent years, there has been an increasing demand for direct imaging printers. Examples of direct imaging printers include inkjet printers, which are advantageous from a cost perspective and are suitable for printing photographs, and electrophotographic printers, which have high productivity and provide a finish that is close to that of offset printing. Along with increasing requests for full-color output, there is also an increasing need for density stability and gradation stability of an output image, and for reduced running costs.

The density of an image formed by an image forming apparatus may change due to, for example, environmental conditions, such as temperature and humidity, and the printed sheet count. Therefore, an image forming condition is adjusted so that the density of the output image is at the desired density (refer to U.S. Pat. No. 8,422,073). For example, the image forming apparatus is configured to form measurement images at an arbitrary timing, and to generate a density characteristic (also referred to as gradation characteristic) based on a measurement result of the measurement images by a sensor.

In an image forming apparatus that includes an original reading device, the measurement images may be formed on a sheet to adjust the image forming condition based on a result obtained by reading the measurement images with the original reading device.

However, a required apparatus configuration depends on a business mode of the user. Therefore, the following problems remain regarding performing such density correction control.

For example, for image forming apparatus installed in a convenience store or an office, a copy function that uses the original reading device (i.e., a reader) is frequently used. Therefore, a user often installs an image forming apparatus that includes an original reading device (reader).

On the other hand, for example, a commercial printing business that creates printed products based on image data written in a page description language may not require an original reading device. Therefore, there has been known image forming apparatus to which an original reading device can be connected.

The image forming apparatus is configured to execute, from among a plurality of halftone processes, the halftone process that is appropriate for the image type. The image forming apparatus needs to generate, when the halftone processes are different, an image forming condition for each halftone process. Therefore, the image forming apparatus is configured to form measurement images corresponding to the halftone processes that have been stored in advance, and to update the image forming conditions corresponding to the types of the halftone processes based on a measurement result by a sensor.

However, in the related-art image forming apparatus, measurement images corresponding to a copy halftone process are formed regardless of whether or not an original reading device is connected. As a result, there have been problems such as wasteful toner consumption and a decrease in productivity.

Therefore, it is an object of the present invention to form appropriate measurement images in accordance with whether or not an original reading device is connected.

SUMMARY OF THE INVENTION

An image forming apparatus according to the present disclosure includes a receiver, and configured to be controlled based on a copy mode for copying an original read by a reading device that is connectable to the image forming apparatus and a print mode for printing image data received by the receiver, the image forming apparatus further comprising: an image forming unit configured to form an image; a measurement unit configured to measure a measurement image formed by the image forming unit; a controller configured to control the image forming unit to form the measurement image, and to control the measurement unit to measure the measurement image; and a detector configured to detect a connection state of the reading device, wherein the measurement image comprises a first measurement image for the copy mode and a second measurement image for the print mode, and the controller is configured to prohibit the image forming unit from forming the first measurement image in a case where the reading device is in an unconnected state, and to control the image forming unit to form the second measurement image in a case where the reading device is in an unconnected state.

Further features of the present invention will become apparent from the following description of exemplary embodiments (with reference to the attached drawings).

DESCRIPTION OF THE EMBODIMENTS

A case in which the present invention is applied to an electrophotographic image forming apparatus is now described with reference to the drawings.

First Embodiment

Figure 1:
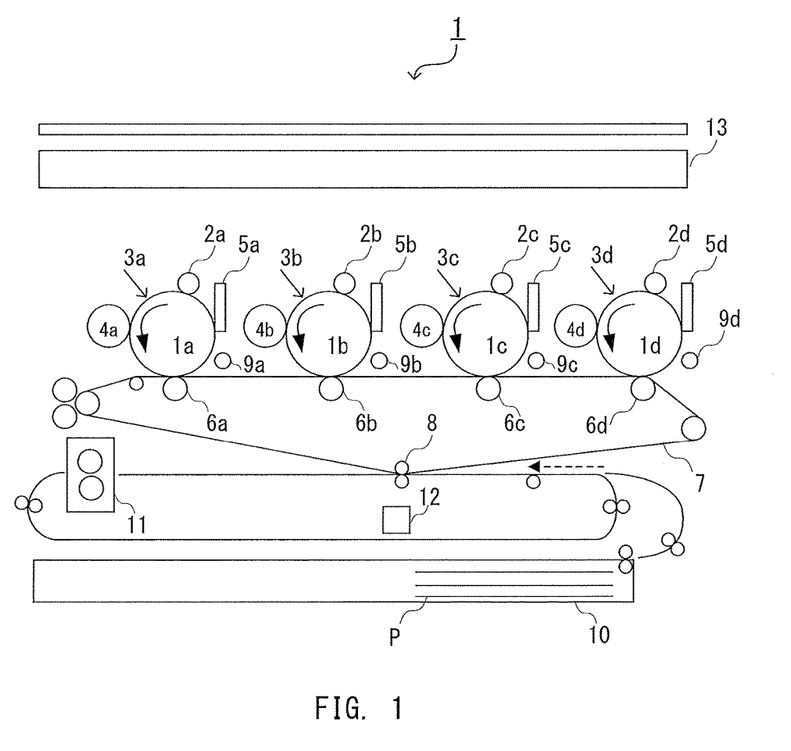
FIG. 1 is a schematic cross-sectional diagram for illustrating an example of a configuration of an image forming apparatus according to a first embodiment of the present invention.

FIG. 1 is a schematic cross-sectional diagram for illustrating an example of a configuration of an image forming apparatus according to a first embodiment of the present invention.

An image forming apparatus 1 includes photosensitive members 1a to 1d, which are each an image bearing member, charging rollers 2a to 2d, exposure devices 3a to 3d, developing devices 4a to 4d, cleaning devices 5a to 5d, primary transfer devices 6a to 6d, an intermediate transfer member 7, a secondary transfer device 8, and neutralization devices 9a to 9d. The image forming apparatus 1 also includes a sheet storage device 10 configured to store a recording material (sheets) P (e.g., paper sheets), a fixing device 11, an optical sensor 12, and an original reading device 13, which is a reader configured to read an original.

The photosensitive members 1a to 1d are image bearing members respectively corresponding to yellow (Y), magenta (M), cyan (C), and black (K). The photosensitive members 1a to 1d are charged by the charging rollers 2a to 2d.

As illustrated in FIG. 1, charging rollers 2a to 2d, exposure devices 3a to 3d, developing devices 4a to 4d, primary transfer devices 6a to 6d, and cleaning devices 5a to 5d are arranged around respective photosensitive members 1a to 1d in order in the rotation direction of the photosensitive members (anticlockwise direction indicated by the arrow). The dashed arrow in FIG. 1 indicates a conveyance direction of the sheet P.

The image-forming members and devices corresponding to the Y (yellow) color (photosensitive member 1a, charging roller 2a, exposure device 3a, developing device 4a, cleaning device 5a, and primary transfer device 6a), which is the farthest upstream color in FIG. 1, are now described as a representative example. The members and devices for the other colors (M, C, and K) have the same functions.

The image bearing member is now described.

The photosensitive member 1a includes an aluminum cylinder serving as an electroconductive substrate. A negatively-charged organic photoconductor (OPC) photosensitive layer is formed on a surface of the cylinder. The photosensitive member 1a is rotated and driven in the direction indicated by the arrow in FIG. 1.

A charging device is now described.

The charging roller 2a is a charging member configured to charge the photosensitive member 1a by coming into contact with or approaching a peripheral surface (top surface) of the photosensitive member 1a. Each end portion in the longitudinal direction (rotation axis direction) of a mandrel (not shown) of the charging roller 2a is rotatably held by a bearing member. The charging roller 2a is pressed against the surface of the photosensitive member 1a.

The image forming apparatus 1 includes a high-voltage power supply (not shown) configured to apply a charging bias to the charging roller 2a, a direct-current voltage generation unit (DC power supply), and an alternating-current voltage generation unit (AC power supply). The charging bias is applied to the charging roller 2a by the high-voltage power supply. The charging roller 2a is configured to charge the photosensitive member 1a such that the potential of the surface of the photosensitive member 1a reaches a predetermined potential. The charging roller 2a functions as charging means for charging the photosensitive member 1a.

The charging means is not limited to the above-mentioned charging roller 2a. For example, the charging means may be a non-contact type corona discharger.

The exposure device is now described.

The exposure device 3a includes, for example, a light source configured to emit laser light, a polygon mirror, and a lens. The laser light emitted from the exposure device 3a is controlled by a laser light amount control circuit (not shown) based on image data. Specifically, the laser light amount control circuit (not shown) is configured to control a laser power and an exposure time.

The exposure time is controlled by using, for example, pulse-width modulation (PWM). The laser light emitted from the exposure device 3a scans the surface of the photosensitive member 1a charged by the charging roller 2a. As a result, an electrostatic latent image is formed on the surface of the photosensitive member 1a.

The developing device is now described.

The developing device 4a is configured to visualize the electrostatic latent image into a toner image by supplying a developer (that includes a toner and a carrier) onto the electrostatic latent image on the photosensitive member 1a.

The developing device 4a includes a developer container and a developing sleeve. A two-component developer is contained in the developer container. The two-component developer is a mixture of a toner and a magnetic carrier.

The developing sleeve is arranged facing the photosensitive member 1a under a state in which a distance of closest approach to the photosensitive member 1a is maintained at 250 μm. The area in which the photosensitive member 1a and the developing sleeve are facing corresponds to a development area.

The developing sleeve includes a magnetic roller on an inner side of the developing sleeve. The two-component developer is carried on the developing sleeve by the magnetic force of the magnetic roller. The amount of the developer carried on the developing sleeve is limited to a predetermined amount by a blade. The developer on the developing sleeve is conveyed to the development area by the rotation of the developing sleeve.

A predetermined developing bias is applied to the developing sleeve from a developing bias application power supply. As a result, the toner on the developing sleeve adheres to the electrostatic latent image on the photosensitive member 1a in the development area.

The developing bias applied to the developing sleeve is a voltage in which a DC voltage and an AC voltage are superimposed. For example, when the charge potential on the photosensitive member 1a is −800 V, the developing bias applies a DC voltage of −620 V and an AC voltage of 1,300 Vpp at a frequency of 10 kHz. The electric field generated by the developing bias causes the toner in the two-component developer to selectively adhere so as to correspond to the electrostatic latent image on the photosensitive member 1a. As a result, the electrostatic latent image is developed as a toner image.

The intermediate transfer member 7 and the transfer roller 6a function as transfer means for transferring the toner image on the photosensitive member 1a. The transfer roller 6a is configured to press the intermediate transfer member 7 against the photosensitive member 1a. The high-voltage power supply is configured to apply a transfer bias (e.g., +1,500 V) to the transfer roller 6a. As a result, the toner image on the photosensitive member 1a is transferred onto the intermediate transfer member 7. A yellow toner image on the photosensitive member 1a, a magenta toner image on the photosensitive member 1b, a cyan toner image on the photosensitive member 1c, and a black toner image on the photosensitive member 1d are each transferred so as to be superimposed on each other. As a result, a full-color toner image is carried on the intermediate transfer member 7. The intermediate transfer member 7 corresponds to the image bearing member carrying the toner image.

The toner image transferred onto the intermediate transfer member 7 is transferred by the secondary transfer device 8 onto a sheet P conveyed from the sheet storage device 10. As a result, the toner image is transferred on the recording medium. The sheet P onto which the toner image has been transferred is subjected to heat and pressure by the fixing device 11, which causes the toner image to melt and become fixed to the sheet P. The sheet P on which the toner image has been fixed is then discharged from the image forming apparatus 1, or is conveyed to a double-sided conveyance path.

The cleaning device 5a is configured to remove the toner image (waste toner) on the photosensitive member 1a that has not been transferred onto the intermediate transfer member 7. In this example, the cleaning device 5a is configured to remove the waste toner by pressing a blade against the photosensitive member 1a. However, the cleaning device 5a is not limited to that configuration, and may be a fur brush, for example.

The optical sensor 12 is configured to radiate light on the toner image fixed on the sheet P, to detect reflected light from the sheet P, and to convert detected image information (detection values) into density information to be used for image density control. The optical sensor 12 includes a light emitting unit including a light emitting element (e.g., a light-emitting diode (LED)) and a light receiving unit including a light receiving element (e.g., a photodiode (PD)) configured to detect specularly reflected light from the sheet P and a diffusely reflected light component. A timing at which the optical sensor 12 acquires the image information is controlled by an image forming unit 102, which is described later. An output result of the optical sensor 12 is stored in a random-access memory (RAM) 108 in a printer processing control unit 106, for example.

The original reading device is now described.

The original reading device 13 is a device for optically reading an original placed on an original table. The original reading device 13 is configured to read the original by irradiating the original with light and forming reflected light from the original into an image on a charge coupled device (CCD). The image data obtained by reading the original is subjected to image processing by an image processing control unit 103, which is described later, and then subjected to predetermined image processing by the printer processing control unit 106.

The original reading device 13 may be optionally connected to the image forming apparatus 1. More specifically, in accordance with the intended use by the user, for example, the reading device 13 may be connected to the image forming apparatus 1 when copying the original so that the original reading device 13 may be used, and disconnected from the image forming apparatus 1 when copying is complete.

Figure 2:
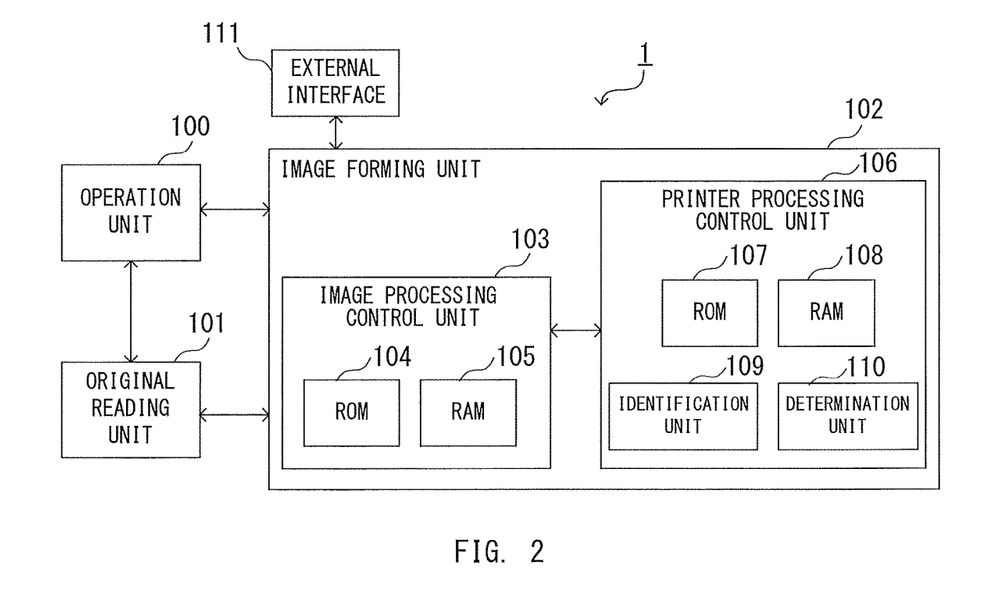
FIG. 2 is a hardware block diagram for illustrating an example of a function configuration of the image forming apparatus.

FIG. 2 is a hardware block diagram for illustrating an example of a function configuration of the image forming apparatus 1.

The image forming apparatus 1 includes an operation unit 100, an original reading unit 101 serving as the original reading device 13, an image forming unit 102, and an external interface 111. The image forming unit 102 includes a processor. The external interface 111 functions as a receiver configured to receive image data transferred from a personal computer (PC) or an external server. The image forming unit 102 also includes an image processing control unit 103 configured to manage a job including image data and a printer processing control unit 106 configured to form the image data as a visible image on the sheet P. In this case, the term "job" refers to information for instructing a series of image forming operations to be performed on a single sheet or a plurality of sheets as a result of an instruction to start the image forming operations. The processor in the image forming unit 102 is configured to control the image forming apparatus 1, which includes controlling the image processing control unit 103 and the printer processing control unit 106. The processor in the image forming unit 102 may be constructed from, for example, a central processing unit (CPU), an application-specific integrated circuit (ASIC), or a digital signal processor (DSP). The processor in the image forming unit 102 is configured to execute each of the processes of FIG. 6 to FIG. 8 based on a control program stored in a read-only memory (ROM) 107.

The printer processing control unit 106 is configured to execute basic control of the image forming operations. The printer processing control unit 106 includes the ROM 107, in which the control program is stored, and the RAM 108, which is configured to temporarily or permanently store various types of data relating to processing execution. The printer processing control unit 106 also includes an identification unit 109 configured to identify the configuration of the image forming apparatus 1 (e.g., whether or not the original reading device 13 is connected to the image forming apparatus 1). The printer processing control unit 106 also includes a determination unit 110 configured to determine an operation condition (i.e., a selection condition of a screen pattern (screen line type), which is described later) during image formation in accordance with an identification result by the identification unit 109. The identification unit 109 and the determination unit 110, which are connected via a bus (not shown), are configured so as to be capable of transmitting and receiving information to and from each other. The identification unit 109 is configured to detect a configuration state (configuration information) of the image forming apparatus 1 stored in the RAM 108, for example, and to detect whether or not the original reading device 13 is connected to the image forming apparatus 1 based on that configuration information.

The image processing control unit 103 includes a ROM 104 in which various types of control programs are stored and a RAM 105 configured to temporarily or permanently store various types of data relating to processing execution. The ROM 104 and the RAM 105, which are connected via a bus (not shown), are configured so as to be capable of transmitting and receiving information to and from each other.

A plurality of different types of screen patterns are stored in the RAM 105 as an image processing pattern to be used during image formation.

The screen pattern to be used during image formation may be arbitrarily selected by the user via a display screen (i.e., a display screen 100a described later) included in the operation unit 100 from among the screen patterns specified as being usable in image processing, which is described later.

In this manner, the user can select at least one screen pattern via the operation unit 100 in accordance with the intended use of the image forming apparatus 1, and instruct image processing (image formation) based on the selected screen pattern(s) to be performed.

For example, as a copy screen pattern, a line screen having a high number of lines is often used in order to avoid moiré occurring during reading of the original and deterioration in thin-line reproducibility of the original to be read.

Unlike that case, when printing image data transferred from a PC or an external server, in consideration of surface unevenness of the original, surface roughness, and the occurrence of moiré during reading of the original, a dot screen having a low number of lines is often used as a page description language (PDL) screen pattern. The image data transferred from a PC or an external server corresponds to image data written based on a PDL. Therefore, it is not desired to use a copy screen pattern as a PDL screen pattern. The conditions for specifying the screen pattern(s) that are usable during image formation are now described.

Figure 3:
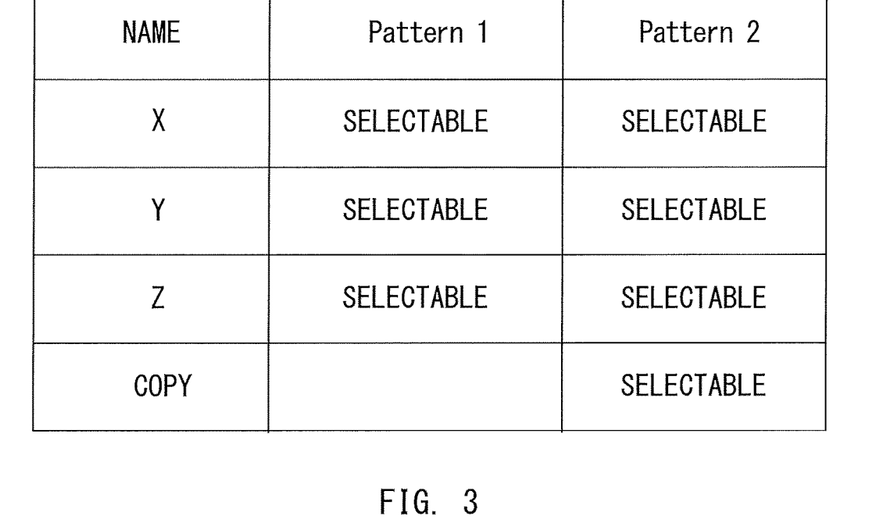
FIG. 3 is a table for showing an example of selection conditions of screen patterns that are applicable during image formation.

FIG. 3 is a table for showing an example of the selection conditions of the screen patterns that are usable during image formation. Information on the selection conditions of the screen patterns is stored in, for example, the RAM 105 together with the screen patterns.

A NAME item represents information for identifying each type of screen pattern (i.e., X, Y, Z, and COPY). A Pattern 1 item and a Pattern 2 item each indicate the selection condition of the screen pattern to be used during image formation. The screen patterns indicated as being "SELECTABLE" in the table may be selected for each selection condition. For example, when the selection condition of the screen pattern is "Pattern 1", the screen pattern X, the screen pattern Y, and the screen pattern Z may be selected, and when the selection condition of the screen pattern is "Pattern 2", in addition to the screen pattern X, the screen pattern Y, and the screen pattern Z, the copy screen pattern COPY may also be selected.

The selection condition of the screen pattern may be set in accordance with the type of the screen pattern, including the copy screen pattern that the image forming apparatus 1 has.

In this embodiment, there is described an example in which there are four screen patterns (X, Y, Z, and COPY), including the copy screen pattern, and two types of selection conditions (Pattern 1 and Pattern 2). The selection conditions are described in more detail later.

Figure 4:
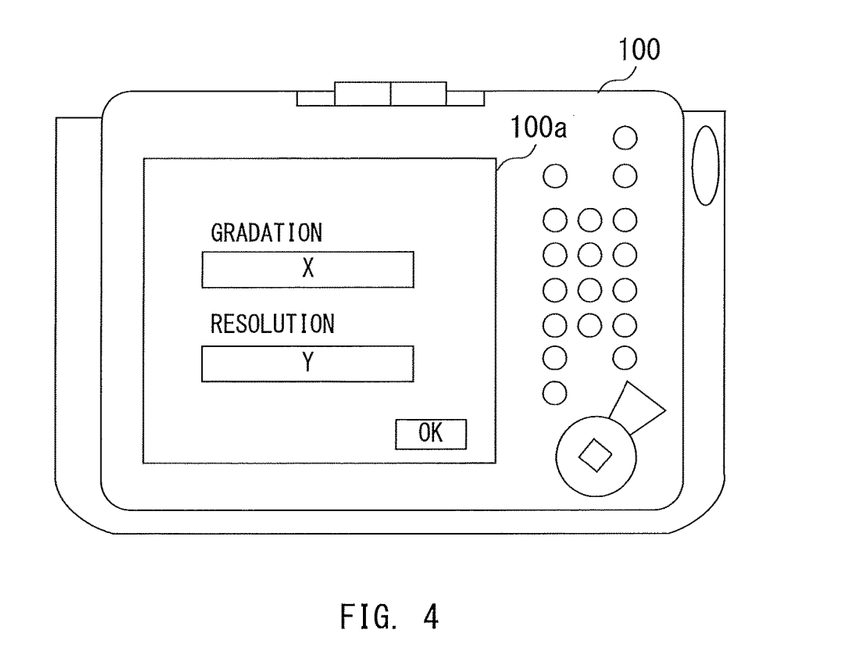
FIG. 4 is a diagram for illustrating an example of a display screen of an operation unit.
Figure 5:
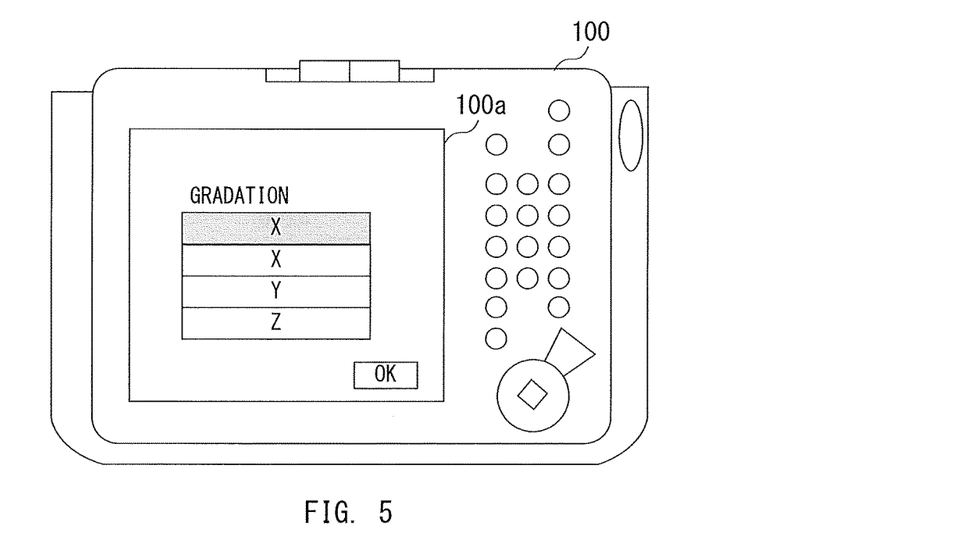
FIG. 5 is a diagram for illustrating an example of a display screen of the operation unit that is different from the display screen illustrated in FIG. 4.

FIG. 4 and FIG. 5 are each a diagram for illustrating an example of a display screen of the operation unit 100 when the user selects and confirms the screen pattern to be used during image formation.

On the display screen 100a illustrated in FIG. 4, the selected screen patterns (X and Y) are displayed. The display screen 100a illustrated in FIG. 5 is a display example when changing the screen pattern to be used during image formation. Changing of the screen pattern is performed by, for example, transitioning from the display state of the display screen 100a illustrated in FIG. 4 to the display screen illustrated in FIG. 5 and the user selecting a screen pattern. The printer processing control unit 106 is configured to perform image formation by using the selected screen pattern(s).

Screen selection control is now described. The image forming apparatus 1 according to this embodiment is configured to identify whether or not the original reading device 13 is connected to the image forming apparatus 1, and to determine the selection condition of the screen pattern to be used during image formation based on the identification result. The determination of the selection condition of the screen pattern is mainly performed by the processor in the image forming unit 102.

Figure 6:
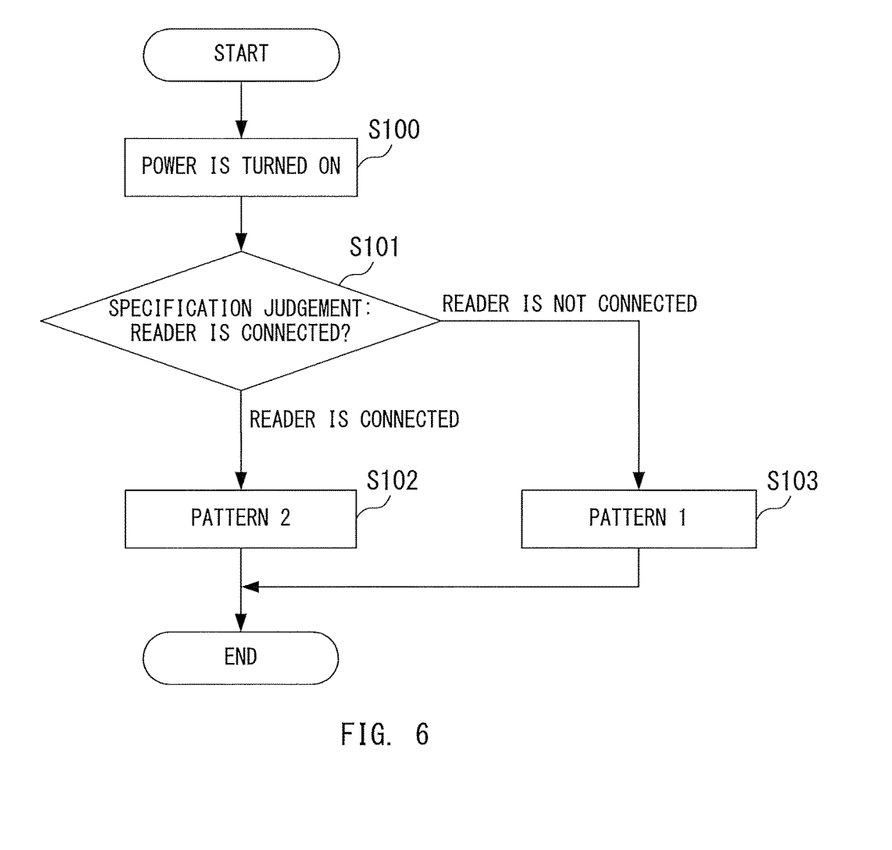
FIG. 6 is a flowchart for illustrating an example of a screen specification processing sequence performed by an image forming apparatus 1.
Figure 7:
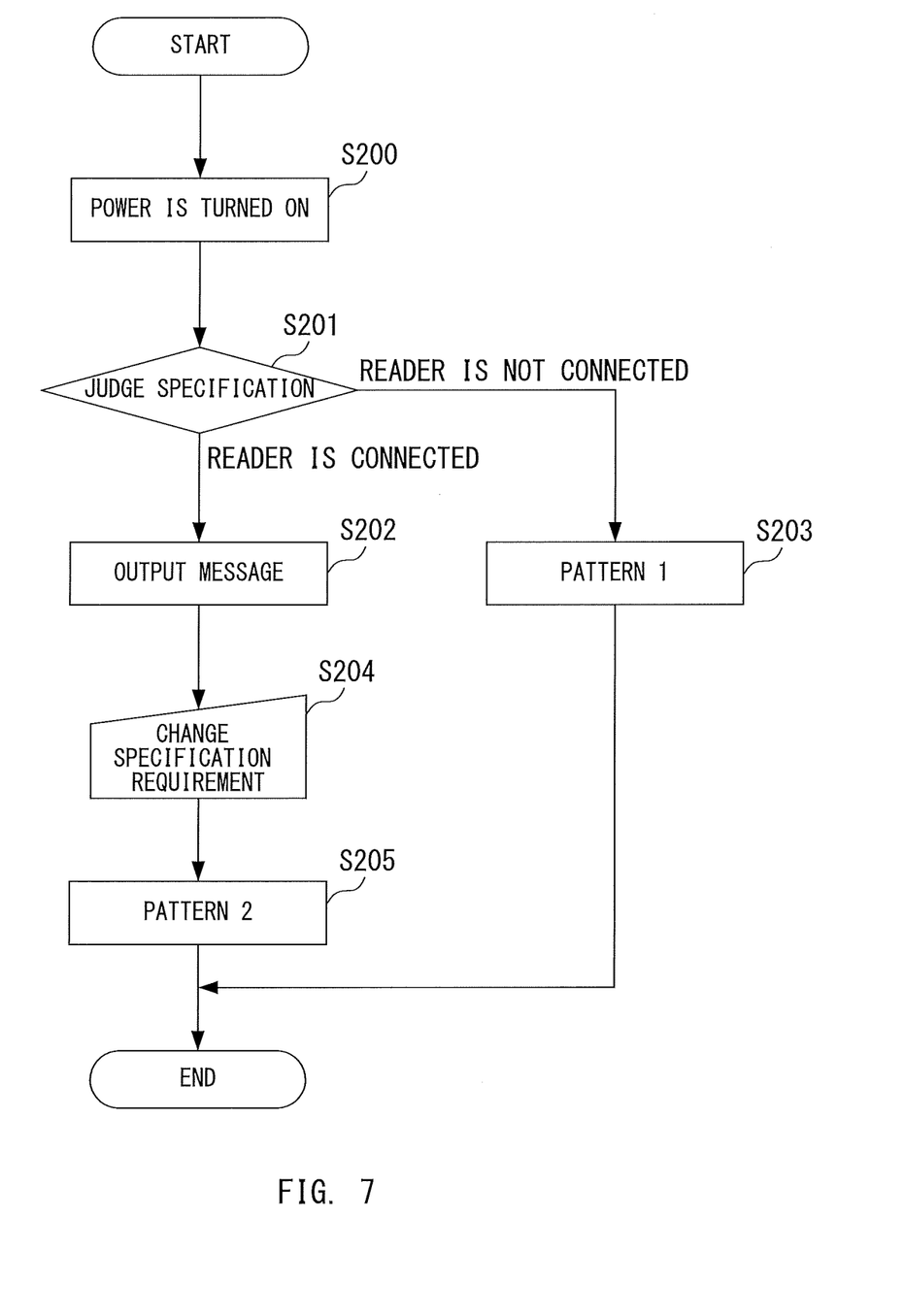
FIG. 7 is a flowchart for illustrating an example of the screen specification processing sequence performed by the image forming apparatus 1 different from the processing sequence of FIG. 6.
Figure 8:
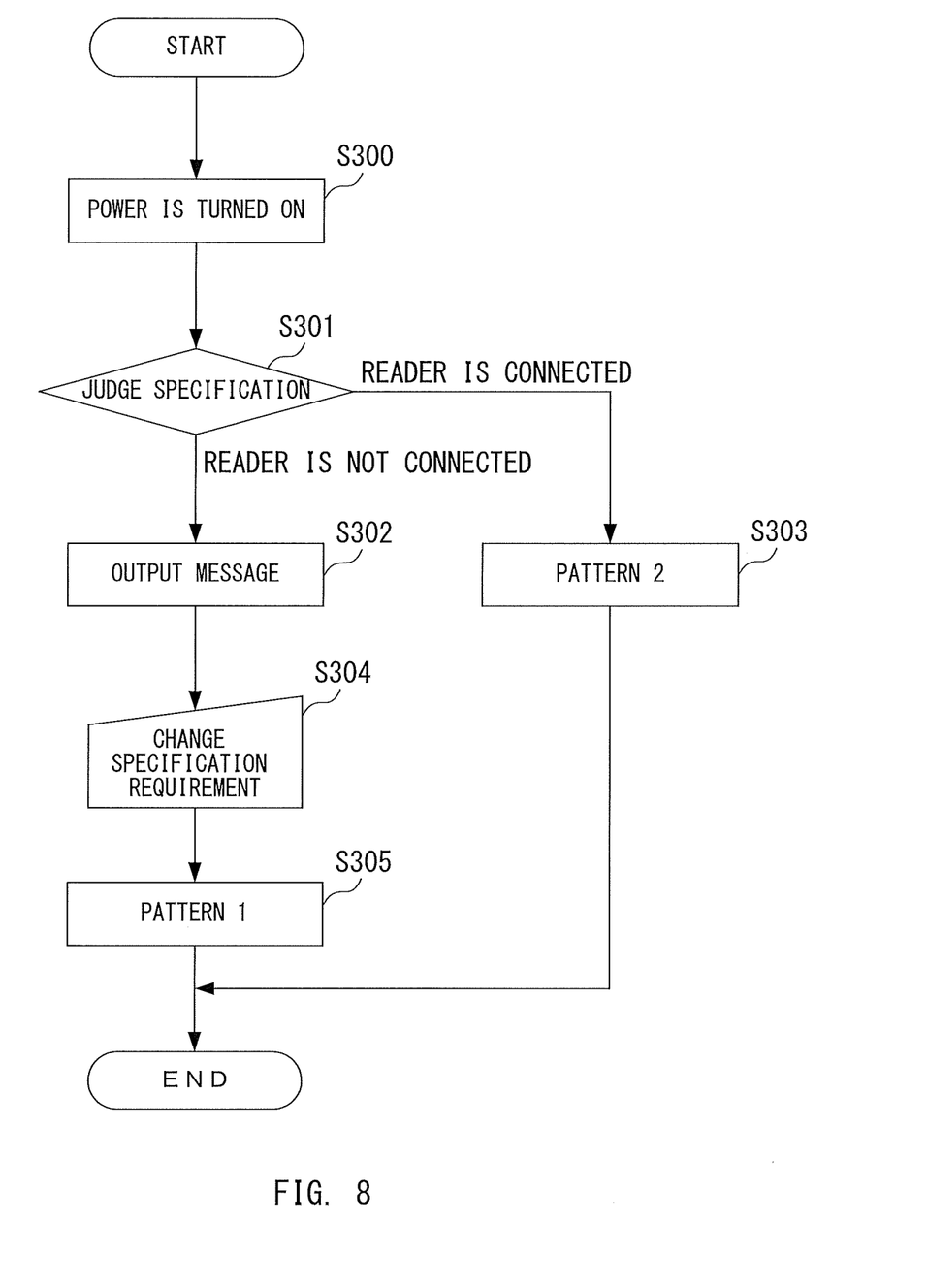
FIG. 8 is a flowchart for illustrating an example of the screen specification processing sequence performed by the image forming apparatus 1 different from the processing sequences of FIG. 6 and FIG. 7.

FIG. 6 to FIG. 8 are each a flowchart for illustrating an example of a screen specification processing sequence performed by the image forming apparatus 1.

The processing sequence illustrated in FIG. 6 illustrates basic control of screen selection control by the processor in the image forming unit 102. To simplify the following description, the control by the processor in the image forming unit 102 is simply described as control by the image forming unit 102.

The image forming unit 102 detects that a main power supply of the image forming apparatus 1 is ON (i.e., is turned on) (Step S100). When the main power supply of the image forming apparatus 1 is turned on by the user, the image forming unit 102 advances the processing to Step S101. Otherwise, when the main power supply of the image forming apparatus 1 has been automatically turned on by a timer function included in the image forming apparatus 1, the image forming unit 102 advances the processing to Step S101.

The image forming unit 102 then judges a current specification of the image forming apparatus 1 (i.e., the configuration of the image forming apparatus 1) (Step S101). In a specification judgment for this case, whether or not the original reading device 13 is connected to the image forming apparatus 1 is judged. Specifically, the image forming unit 102 controls the identification unit 109 in order to detect the current configuration state of the image forming apparatus 1. The image forming unit 102 stores the configuration information in, for example, the RAM 108.

When it is judged that the original reading device 13 is connected (Step S101: Reader is connected), the image forming unit 102 controls the determination unit 110 and determines that the selection condition of the screen pattern is Pattern 2 (refer to FIG. 3) (Step S102). When it is judged that the original reading device 13 is not connected (Step S101: Reader is not connected), the image forming unit 102 determines that the selection condition of the screen pattern is Pattern 1 (refer to FIG. 3) (Step S103).

The image forming unit 102 stores the determination result of the selection condition in, for example, the RAM 108. The connection condition of the screen pattern(s) selectable by the image forming apparatus 1 is thus determined by identifying the configuration state of the image forming apparatus 1. However, the image forming apparatus 1 may also be configured such that a recently defined selection condition of the screen pattern continues to be used even when starting the image forming apparatus 1 the next and subsequent times.

The processing sequence illustrated in FIG. 7 is an example of the processing sequence of screen selection control when a connection state of the original reading device 13 is changed from an unconnected state to a connected state during a period in which the main power supply of the image forming apparatus 1 is OFF. There is now described a case in which the original reading device 13 was not connected during the previous specification judgment of the image forming apparatus 1 (Step S101 illustrated in FIG. 2).

The image forming unit 102 detects that the main power supply of the image forming apparatus 1 is ON (i.e., is turned on) (Step S200). When the main power supply of the image forming apparatus 1 is turned on by the user, the image forming unit 102 advances the processing to Step S201. Otherwise, when the main power supply of the image forming apparatus 1 has been automatically turned on by a timer function included in the image forming apparatus 1, the image forming unit 102 advances the processing to Step S201.

The image forming unit 102 then judges the current specification of the image forming apparatus 1 (Step S201).

When it is judged that the original reading device 13 is connected (Step S201: Reader is connected), the image forming unit 102 issues a predetermined message relating to the specification change to the user via the operation unit 100 (Step S202). The message may be, for example, notification of a confirmation message made using audio via a speaker (not shown). The message may also be, for example, a confirmation message to be displayed on the display screen 100*a* of the operation unit 100. An example of the confirmation message to be displayed on the display screen 100*a* is now described with reference to FIG. 9.

Figure 9:
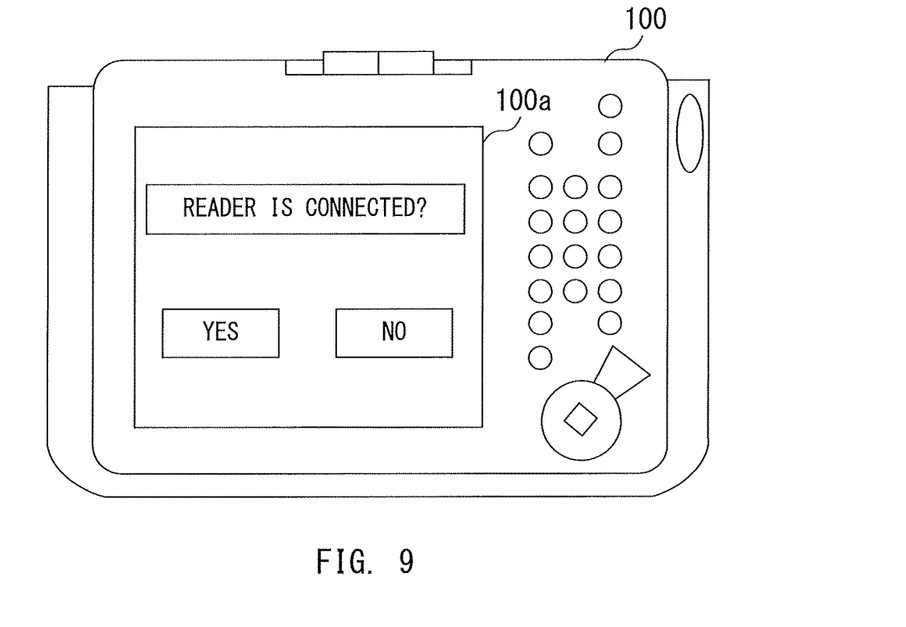
FIG. 9 is a diagram for illustrating an example of a confirmation message regarding whether or not an original reading device is connected.

FIG. 9 is a diagram for illustrating an example of a confirmation message regarding whether or not the original reading device 13 is connected. A message asking "Has reader been connected?" is displayed on the display screen 100*a* together with "YES" and "NO" selection buttons representing responses. The user changes a specification requirement of the image forming apparatus 1 by selecting the "YES" button when the original reading device 13 is connected, and selecting the "NO" button when the original reading device 13 is not connected (Step S204).

Returning to the description of FIG. 7, when the user has selected the "YES" button, the image forming unit 102 determines that the selection condition of the screen pattern is Pattern 2 (refer to FIG. 3) (Step S205). In this case, the image forming unit 102 determines the selection condition that is appropriate for the current specification (i.e., for a case in which a reader is connected) of the image forming apparatus 1. When the user has selected the "NO" button, this may mean that a device malfunction, a detection error, or a selection mistake by the user, for example, has occurred. Therefore, in such a case, the image forming unit 102 controls such that the processing of Step S201 is executed again, or such that a message (not shown) prompting the user to reconfirm is displayed, for example.

When it is judged that the original reading device 13 is not connected (Step S201: Reader is not connected), the image forming unit 102 continues to maintain Pattern 1 as the selection condition of the screen pattern (refer to FIG. 3) (Step S203). As a result, even when the configuration state of the image forming apparatus 1 has been changed, the image forming unit 102 is capable of determining the selection condition of the screen pattern that is appropriate for the changed configuration.

The processing sequence illustrated in FIG. 8 is an example of the processing sequence of screen selection control when the connection state of the original reading device 13 is changed from a connected state to an unconnected state during a period in which the main power supply of the image forming apparatus 1 is OFF. There is now described a case in which the original reading device 13 was connected during the previous specification judgment of the image forming apparatus 1 (Step S101 illustrated in FIG. 2).

The image forming unit 102 detects that the main power supply of the image forming apparatus 1 is ON (Step S300). When the main power supply of the image forming apparatus 1 is turned on by the user, the image forming unit 102 advances the processing to Step S301. Otherwise, when the main power supply of the image forming apparatus 1 has been automatically turned on by a timer function included in the image forming apparatus 1, the image forming unit 102 advances the processing to Step S301.

The image forming unit 102 then judges the current specification of the image forming apparatus 1 (Step S301).

When it is judged that the original reading device 13 is not connected (Step S301: Reader is not connected), the image forming unit 102 issues a message relating to the specification change to the user via the operation unit 100 (Step S302). The message may be, for example, notification of a confirmation message made using audio via a speaker (not shown). The message may also be, for example, a confirmation message to be displayed on the display screen 100*a* of the operation unit 100. An example of the confirmation message to be displayed on the display screen 100*a* is now described with reference to FIG. 10.

Figure 10:
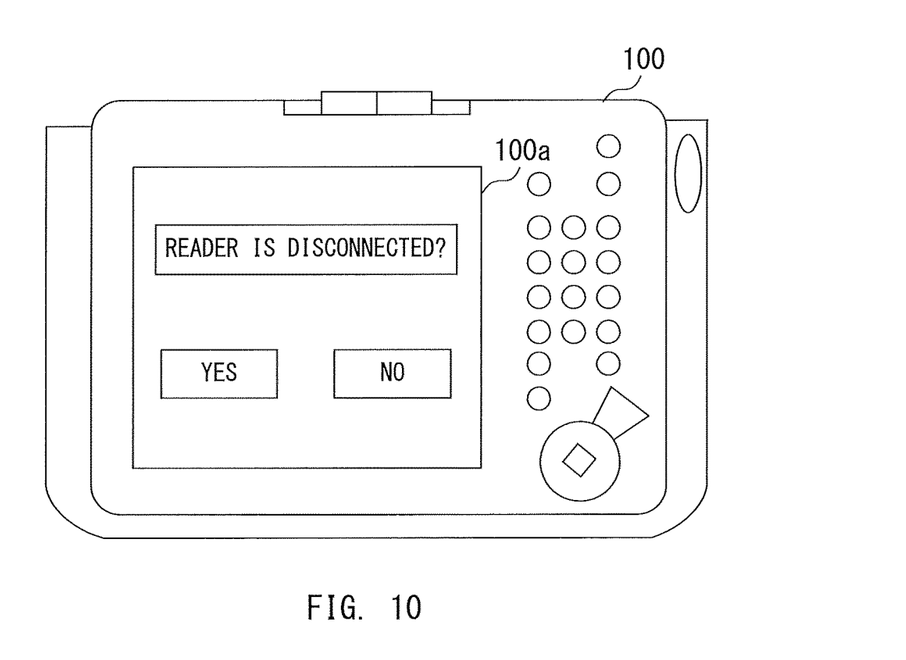
FIG. 10 is a diagram for illustrating an example of the confirmation message regarding whether or not the original reading device is disconnected.

FIG. 10 is a diagram for illustrating an example of a confirmation message regarding whether or not the original reading device 13 is disconnected. A message asking "Has reader been disconnected?" is displayed on the display screen 100*a* together with "YES" and "NO" selection buttons. The user changes the specification requirement of the image forming apparatus 1 by selecting the "YES" button when the original reading device 13 is not connected (disconnected), and selecting the "NO" button when the original reading device 13 is not removed (Step S304).

Returning to the description of FIG. 8, when the user has selected the "YES" button, the image forming unit 102 determines that the selection condition of the screen pattern is Pattern 1 (refer to FIG. 3) (Step S305). In this case, the image forming unit 102 determines the selection condition that is appropriate for the current specification (i.e., for a case in which a reader is not connected) of the image forming apparatus 1. When the user has selected the "NO" button, this may mean that a device malfunction, a detection error, or a selection mistake by the user, for example, has occurred. Therefore, in such a case, the image forming unit 102 controls such that the processing of Step S301 is executed again, or such that a message (not shown) prompting the user to reconfirm is displayed, for example.

When it is judged that the original reading device 13 is connected (Step S301: Reader is connected), the image forming unit 102 continues to maintain Pattern 2 as the selection condition of the screen pattern (refer to FIG. 3) (Step S303). As a result, even when the configuration state of the image forming apparatus 1 has been changed, the image forming unit 102 is capable of determining the selection condition of the screen pattern that is appropriate for the changed configuration.

Thus, with the image forming apparatus 1 according to this embodiment, the selection condition of the screen pattern may be determined in accordance with the configuration state of the image forming apparatus 1, and the screen pattern(s) usable in image formation may be switched. As a result, for example, the occurrence of image defects caused by an erroneous use of the copy screen pattern for image data written in a PDL can be avoided in advance.

More specifically, the occurrence of image defects during image formation due to an erroneous selection of the screen pattern can be efficiently prevented by determining in advance whether or not the copy screen pattern (screen pattern COPY) is selectable in accordance with the configuration of the image forming apparatus 1.

Second Embodiment

In a second embodiment of the present invention, there is described an example in which a screen pattern determined in accordance with the configuration state of the image forming apparatus 1 is used for image density control that uses the sheet P, namely, is used for adjustment of an image forming condition for correcting a gradation characteristic of the image to be formed by the image forming apparatus 1 to an ideal gradation characteristic. In this embodiment, parts with the same function and configuration as those in the first embodiment are denoted using like reference symbols, and a description thereof is omitted. The image forming condition may be, for example, the charging bias to be supplied to the charging rollers 2a, 2b, 2c, and 2d from the high-voltage power supply. The image forming condition may also be, for example, the laser power of the exposure devices 3a, 3b, 3c, and 3d controlled by the laser light amount control circuit. Further, the image forming condition may be, for example, a gradation correction table for correcting the gradation characteristic of the image to be formed by the image forming apparatus 1 to the ideal gradation characteristic. The gradation correction table is a one-dimensional lookup table. In addition, the image forming condition may be, for example, the developing bias to be applied to the developing sleeve.

Figure 11A:
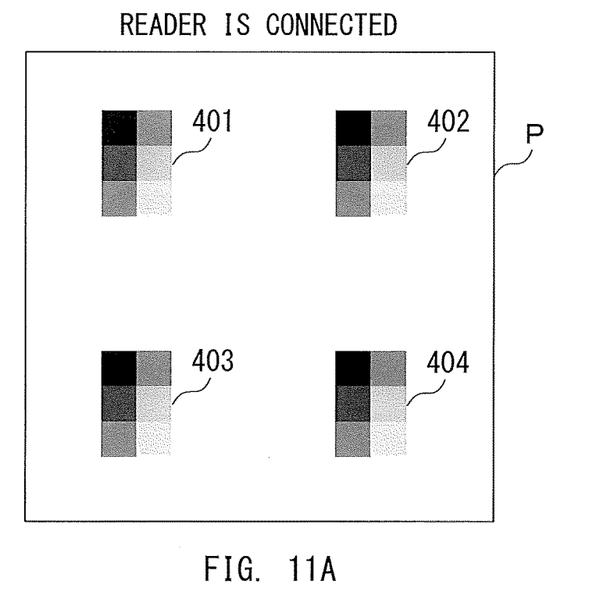
FIG. 11A and FIG. 11B are each a diagram for illustrating an example of patch images (measurement images) to be used for image density control according to a second embodiment of the present invention.
Figure 11B:
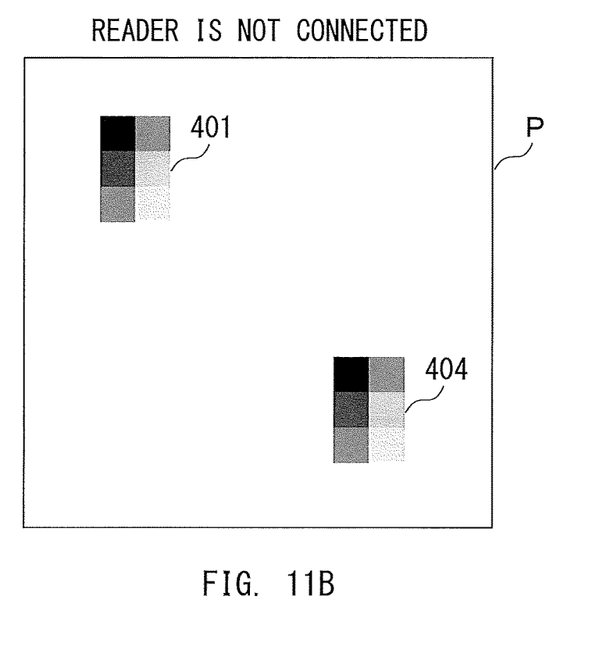

The measurement images are now described. FIG. 11A and FIG. 11B are each a diagram for illustrating an example of patch images (measurement images) to be used for image density control.

The image processing control unit 103 is configured to form, during image density adjustment control, measurement images (hereinafter referred to as "patch images") to be used for image density control on the sheet P. As illustrated in FIG. 11A and FIG. 11B, the image processing control unit 103 is configured to form patch images of a plurality of patterns on one sheet P based on the screen pattern to be used during image formation. Reflected light in each color is detected from the patch images formed on the sheet P by the optical sensor 12. The detection result of the optical sensor 12 is converted into density information. Adjustment of the image forming condition is performed based on that density information.

In the description of this embodiment, the patch images output on one sheet P are formed based on a screen pattern selection priority. The screen pattern selection priority is now described with reference to FIG. 12.

Figure 12:
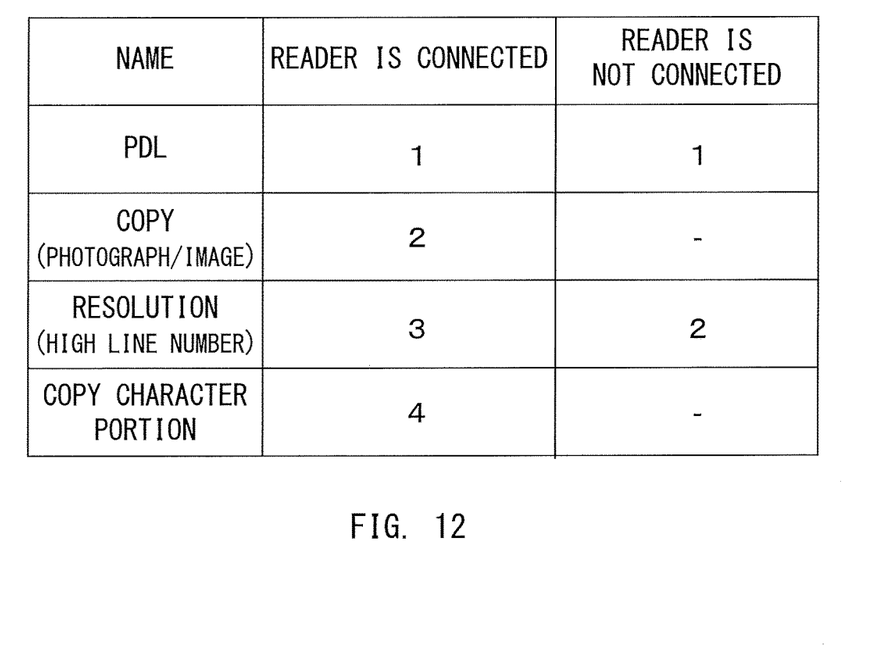
FIG. 12 is a table for showing an example of information indicating a screen pattern selection priority that the image forming apparatus 1 has.

FIG. 12 is a table for showing an example of information indicating a screen pattern selection priority that the image forming apparatus 1 has. Information on the screen pattern selection priority is stored in, for example, the RAM 105.

The NAME item represents information for identifying each type of screen pattern (i.e., PDL screen pattern, copy (photograph/image) screen pattern, resolution (high line number) screen pattern, and copy character portion screen pattern). An order (1 to 4) indicating the selection priority of each screen pattern is set for each configuration state (i.e., when a reader is connected and when a reader is not connected). A case is now described in which, for example, the screen patterns X, Y, and Z shown in FIG. 3 are selectable as the PDL screen pattern or as the resolution screen pattern, and the copy screen pattern COPY is selectable as the copy screen pattern.

In such a case, returning to the description of FIG. 11A and FIG. 11B, a patch image 401 formed on the sheet P is a patch image formed based on the PDL screen pattern, a patch image 402 is a patch image formed based on the copy (photograph/image) screen pattern, a patch image 403 is a patch image formed based on the resolution (high line number) screen pattern, and a patch image 404 is a patch image formed based on the copy character portion screen pattern.

Image density correction processing is now described. The image forming unit 102 is configured to change the image density correction processing in the following manner based on the screen pattern determined in accordance with the result of the judgment of the current specification of the image forming apparatus 1 (e.g., the result of the processing of Step S101 illustrated in FIG. 6).

The image forming unit 102 is configured to form, when the original reading device 13 is connected, the patch images 401 to 404 on the sheet P by controlling the image processing control unit 103 as illustrated in FIG. 11A.

In this case, Pattern 2 (refer to FIG. 3) is selected as the selection condition of the screen pattern, and as a result, four different patch images are formed based on four screen patterns.

On the other hand, when the original reading device 13 is not connected, the image forming unit 102 is configured to form the patch images 401 and 404 on the sheet P by controlling the image processing control unit 103 as illustrated in FIG. 11B.

In this case, Pattern 1 (refer to FIG. 3) is selected as the selection condition of the screen pattern, and as a result, two different patch images are formed based on two screen patterns.

In this manner, with the image forming apparatus 1 according to this embodiment, a toner consumption amount during density correction control may be reduced by using the determined screen patterns for image density control.

In this embodiment, there is described an example in which four patch images are formed on the sheet P based on four screen patterns. However, the present invention is not limited to this.

Figure 13:
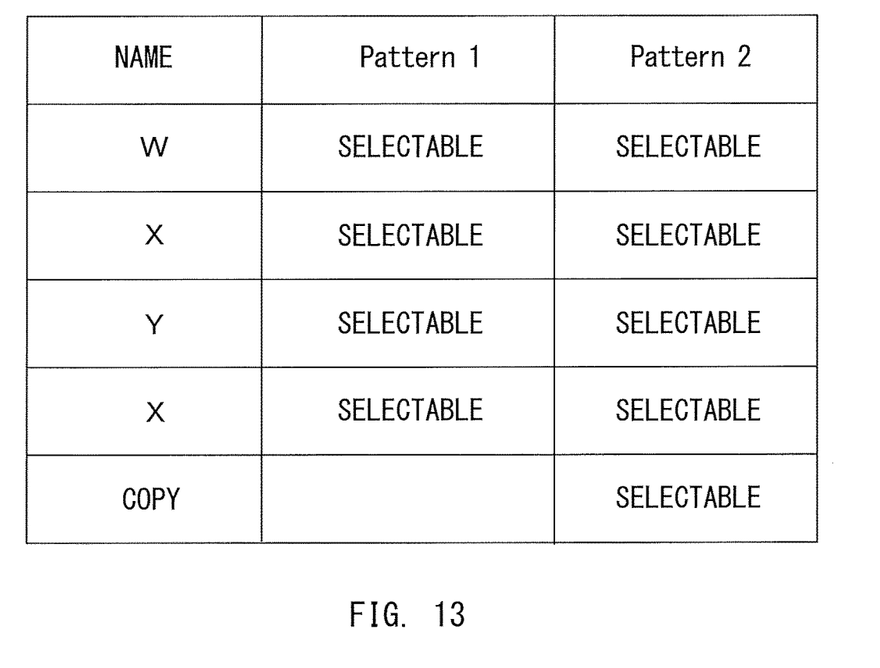
FIG. 13 is a table for showing an example of the selection conditions of the screen patterns that the image forming apparatus has.

FIG. 13 is a table for showing an example of the selection conditions of the screen patterns that the image forming apparatus 1 according to this embodiment has. For the selection conditions shown in FIG. 13, the number of selectable screen patterns is increased to five (screen pattern W has been added), which is more than the number of selection conditions shown in FIG. 3.

A case is described here in which the number of patch images that may be formed on the sheet P is four, but the number of selectable screen patterns is more than that (e.g., 5).

Figure 14:
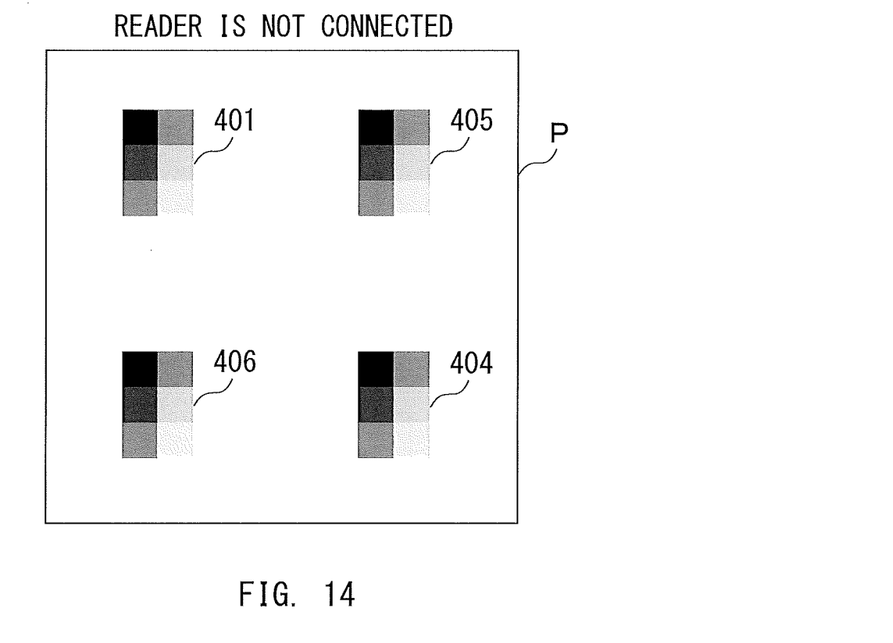
FIG. 14 is a diagram for illustrating an example in which, instead of a copy screen pattern, the patch images are formed on a sheet based on another screen pattern in accordance with a screen selection priority.

In this case, for example, the patch images may be formed based on another screen pattern in accordance with a screen selection priority instead of a copy screen pattern, which is excluded when a reader is not connected.

FIG. 14 is a diagram for illustrating an example in which, instead of a copy screen pattern, the patch images are formed on the sheet P based on another screen pattern in accordance with the screen selection priority. When a reader is not connected to the image forming apparatus 1, patch images 405 and 406 are formed on the sheet P based on the screen selection priority in place of the excluded copy patch images 402 and 403. This enables patch images that are based on another screen pattern not selected based on the screen selection priority to be formed. As a result, for example, tinge stability of screen patterns that have not yet been selected can be improved.

The image forming apparatus 1 according to this embodiment is configured to form four types of screen pattern measurement images on one sheet P. However, for example, the image forming apparatus 1 may be configured to form one type of screen pattern measurement image on one sheet P. With such a configuration, when the original reading device 13 is connected to the image forming apparatus 1, the measurement image is formed on four sheets P, and when the original reading device 13 is not connected to the image forming apparatus 1, the measurement image is formed on two sheets P. More specifically, when the original reading device 13 is not connected to the image forming apparatus 1, because a copy mode is not executed, the formation of unnecessary screen pattern measurement images can be prohibited.

Third Embodiment

In a third embodiment of the present invention, there is described an example in which a screen pattern determined in accordance with the configuration state of the image forming apparatus 1 is used for image density control that uses the photosensitive member 1*a*. In this embodiment, parts with the same function and configuration as those in the first and second embodiments are denoted using like reference symbols, and a description thereof is omitted.

Figure 15:
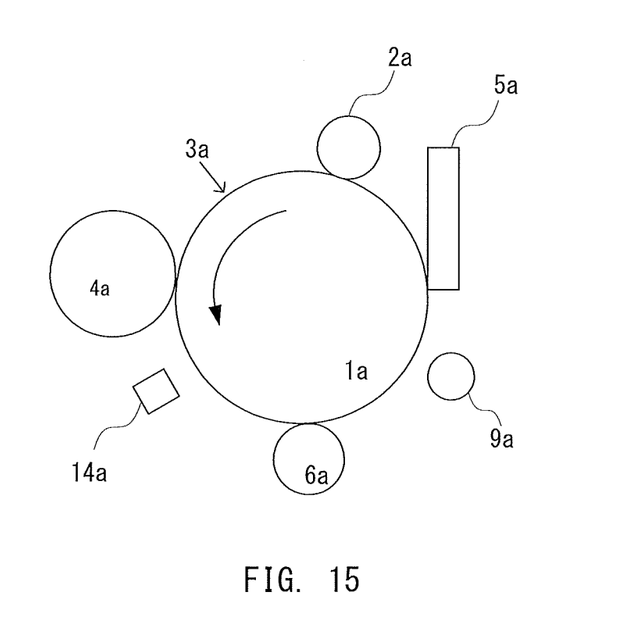
FIG. 15 is a schematic cross-sectional diagram for illustrating an example of a peripheral configuration of a photosensitive member of an image forming apparatus according to a third embodiment of the present invention.

FIG. 15 is a schematic cross-sectional diagram for illustrating an example of a peripheral configuration of the photosensitive member 1*a* of the image forming apparatus 1 according to this embodiment. A difference from the peripheral configuration of the photosensitive member 1*a* illustrated in FIG. 1 is that an image density sensor 14*a* for detecting the image density of the patch images formed on the image bearing member, namely, on the photosensitive member 1*a*, is arranged facing the photosensitive member 1*a*.

The image density sensor 14*a* is configured to radiate light on the toner image formed on the photosensitive member 1*a*, to detect reflected light from the photosensitive member 1*a*, and to convert detected image information (detection values) into density information to be used for image density control. The image density sensor 14*a* includes a light emitting unit including a light emitting element (e.g., an LED) and a light receiving unit including a light receiving element (e.g., a photodiode). The light receiving unit of the image density sensor 14*a* may be configured to detect specularly reflected light from the photosensitive member 1*a*.

The timing at which the image density sensor 14*a* acquires the image information is controlled by the image forming unit 102. The output result of the image density sensor 14*a* is stored in the RAM 108 in the printer processing control unit 106, for example.

The measurement images are now described. FIG. 16A to FIG. 16D are each a diagram for illustrating an example of patch images (measurement images) to be used for image density control.

Figure 16A:
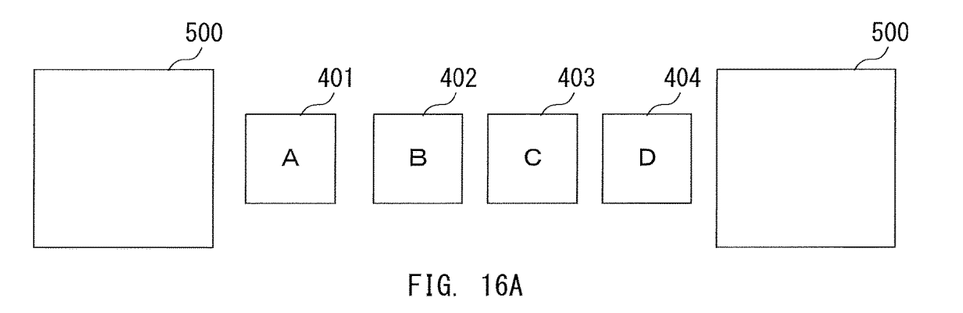
FIG. 16A, FIG. 16B, FIG. 16C, and FIG. 16D are each a diagram for illustrating an example of the patch images (measurement images) to be used for image density control.

The image processing control unit 103 is configured to form, during the image density adjustment control according to this embodiment, patch images at a predetermined timing when continuously performing image formation.

The timing of the patch image formation is a timing having an interval (image interval) between the time at which an image 500 is formed on the sheet P and the time at which the image 500 is formed on the next sheet P when a predetermined image formation count (e.g., 100 times) has passed. The image processing control unit 103 is configured to form patch images 401(A), 402(B), 403(C), and 404(D) as illustrated in FIG. 16A on a non-image area based on that image interval. In the following, there is described a case in which each patch image is formed based on information indicating the screen pattern selection priority shown in FIG. 12.

Image density correction processing is now described.

The image forming unit 102 is configured to change the image density correction processing in the following manner based on the screen pattern determined in accordance with the result of the judgment of the current specification of the image forming apparatus 1 (e.g., the result of the processing of Step S101 illustrated in FIG. 6).

The image forming unit 102 is configured to form, when the original reading device 13 is connected, the patch images 401 to 404 on each of the photosensitive members 1*a*, 1*b*, 1*c*, and 1*d* by controlling the image processing control unit 103 as illustrated in FIG. 16A.

In this case, Pattern 2 (refer to FIG. 3) is selected as the selection condition of the screen pattern, and as a result, four different patch images are formed based on four screen patterns.

Figure 16B:
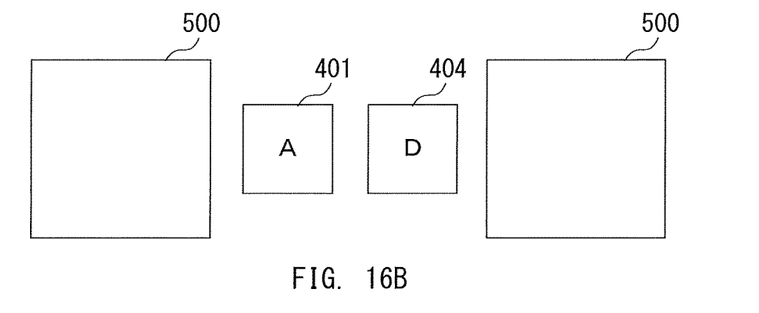

The image forming unit 102 is configured to form, when the original reading device 13 is not connected, the patch images 401 and 404 on each of the photosensitive members 1*a*, 1*b*, 1*c*, and 1*d* by controlling the image processing control unit 103 as illustrated in FIG. 16B.

In this case, Pattern 1 (refer to FIG. 3) is selected as the selection condition of the screen pattern, and as a result, two different patch images are formed based on two screen patterns.

Thus, with the image forming apparatus 1 according to this embodiment, using the determined screen pattern for image density control enables the overall adjustment time of the image density to be shortened because the patch images are formed more efficiently. As a result, image formation productivity may be improved. In addition to reading the patch images formed on the photosensitive member 1*a*, the image forming apparatus 1 may also be configured to read patch images formed on the intermediate transfer member 7, for example.

In this embodiment, there is described an example in which four patch images are formed on each of the photosensitive members 1*a*, 1*b*, 1*c*, and 1*d* based on four screen patterns. However, the present invention is not limited to this.

For example, when the number of patch images that can be formed on the photosensitive member 1*a* is two, and the number of selectable screen patterns is greater than two, this means that only the screen patterns having the first or second highest screen selection priority can be selected.

The image forming apparatus 1 may be configured such that a "reader is connected", for example.

Figure 16C:
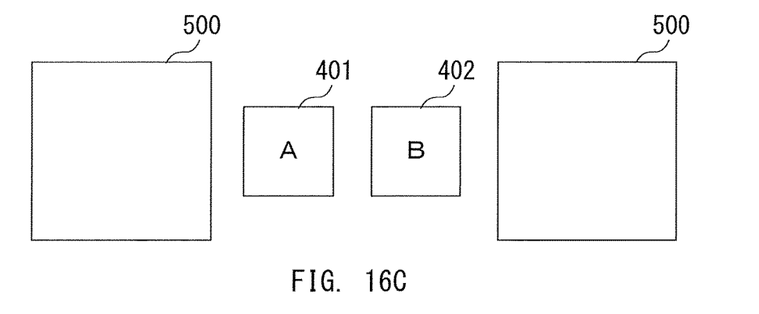

In this case, as illustrated in FIG. 16C, the patch image 401 formed based on the PDL screen pattern and the patch image 402 formed based on the copy (photograph/image) screen pattern are formed.

On the other hand, the image forming apparatus 1 may be configured such that a "reader is not connected".

In this case, for example, the image forming apparatus 1 may be configured such that a patch image based on another screen pattern in accordance with the screen selection priority may be formed instead of the copy screen pattern, which is excluded when a reader is not connected.

Figure 16D:
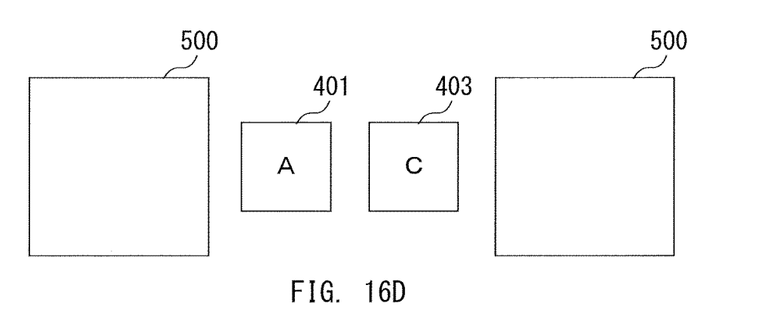

FIG. 16D is a diagram for illustrating an example in which, instead of a copy screen pattern, the patch image 403C is formed on the photosensitive member 1a based on another screen pattern in accordance with the screen selection priority. Thus, patch images based on another screen pattern that was not selected based on the screen selection priority may be formed. As a result, for example, the tinge stability of screen patterns that have not yet been selected can be improved.

The image forming apparatus 1 may also be configured to select a screen pattern to be used for calibration in accordance with whether or not the original reading device 13 is connected to the image forming apparatus 1.

Therefore, according to one embodiment of the present invention, appropriate measurement images can be formed in accordance with whether or not an original reading device is connected.

The present invention may be embodied in various modes. For example, in the first to third embodiments described above, the image forming unit 102 is described as including a processor. However, in another embodiment of the present invention, the image processing control unit 103 includes a processor 102a different from the processor in the image forming unit 102, and the printer processing control unit 106 includes a processor 102b different from the processor in the image forming unit 102 and different from the processor 102a.

The processor in the image forming unit 102 may be configured to execute a part of the processing of the image processing control unit 103 and the printer processing control unit 106.

An ASIC different from the processor in the image forming unit 102 may be configured to execute the identification processing performed by the identification unit 109, and an ASIC different from the processor in the image forming unit 102 may be configured to execute the determination processing performed by the determination unit 110.

Arbitrary control of the image forming apparatus 1 may be implemented by, for example, a micro-processing unit (MPU), an ASIC, and a system-on-a-chip (SOC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-244463, filed Dec. 15, 2015 which is hereby incorporated by reference herein in its entirety.

What is claimed is:

1. An image forming apparatus, comprising a receiver, configured to be controlled based on a copy mode for copying an original read by a reading device that is connectable to the image forming apparatus and a print mode for printing image data received by the receiver, the image forming apparatus further comprising:
an image forming unit configured to form an image;
a measurement unit configured to measure a measurement image formed by the image forming unit;
a controller configured to control the image forming unit to form the measurement image, and to control the measurement unit to measure the measurement image; and
a detector configured to detect a connection state of the reading device,
wherein the measurement image comprises a first measurement image for the copy mode and a second measurement image for the print mode, and
the controller is configured to prohibit the image forming unit from forming the first measurement image in a case where the reading device is in an unconnected state, and to control the image forming unit to form the second measurement image in a case where the reading device is in an unconnected state.

2. The image forming apparatus according to claim 1, wherein the controller is configured to adjust a gradation characteristic of an image to be formed by the image forming unit during the copy mode based on a measurement result of the first measurement image, and to adjust the gradation characteristic of the image to be formed by the image forming unit during the print mode based on a measurement result of the second measurement image.

3. The image forming apparatus according to claim 1, further comprising a storage unit configured to store information indicating whether or not the reading device is connected to the image forming apparatus,
wherein the detector is configured to detect the connection state of the reading device based on the information stored in the storage unit.

4. The image forming apparatus according to claim 2, wherein the controller is configured to:
generate a gradation correction condition of the image based on each measurement result of the measurement unit; and
generate, based on the measurement result of the first measurement image, a first gradation correction condition to be used during the copy mode, and based on the measurement result of the second measurement image, a second gradation correction condition to be used during the print mode.

5. The image forming apparatus according to claim 1, wherein the first measurement image corresponds to a screen pattern to be used during the copy mode, and
wherein the second measurement image corresponds to a screen pattern to be used during the print mode.

6. The image forming apparatus according to claim 5, further comprising an operation unit,
wherein the controller is configured to set the screen pattern based on user instruction information input from the operation unit.

7. The image forming apparatus according to claim 1, wherein the measurement unit is configured to measure the measurement image formed on a sheet.

8. The image forming apparatus according to claim 1,
wherein the image forming unit comprises a photosensitive member, and
wherein the measurement unit is configured to measure the measurement image formed on the photosensitive member.

9. The image forming apparatus according to claim 1, further comprising an intermediate transfer member onto which the measurement image formed by the image forming unit is to be transferred, and
wherein the measurement unit is configured to measure the measurement image formed on the intermediate transfer member.

* * * * *